(12) United States Patent
Wang et al.

(10) Patent No.: US 11,537,874 B1
(45) Date of Patent: Dec. 27, 2022

(54) DEEP FACTOR MODELS WITH RANDOM EFFECTS FOR FORECASTING

(71) Applicant: Amazon Technologies, Inc., Seattle, WA (US)

(72) Inventors: Yuyang Wang, Belmont, CA (US); Alexander Johannes Smola, Sunnyvale, CA (US); Dean P. Foster, New York, NY (US); Tim Januschowski, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1175 days.

(21) Appl. No.: 16/101,118

(22) Filed: Aug. 10, 2018

(51) Int. Cl.
  *G06N 3/08* (2006.01)
  *G06N 7/00* (2006.01)
  *G06K 9/62* (2022.01)
  *G06Q 10/04* (2012.01)
  *G06N 20/00* (2019.01)

(52) U.S. Cl.
  CPC ........... *G06N 3/08* (2013.01); *G06K 9/6248* (2013.01); *G06N 7/005* (2013.01); *G06N 20/00* (2019.01); *G06Q 10/04* (2013.01)

(58) Field of Classification Search
  CPC .......... G06N 3/08; G06N 20/00; G06N 7/005; G06Q 10/04; G06K 9/6248
  See application file for complete search history.

(56) References Cited

U.S. PATENT DOCUMENTS

| | | | | |
|---|---|---|---|---|
| 7,716,011 | B2* | 5/2010 | Thibaux | G06K 9/00536 |
| | | | | 702/179 |
| 2012/0226645 | A1* | 9/2012 | O'Rourke | G06Q 40/06 |
| | | | | 706/46 |
| 2014/0136463 | A1* | 5/2014 | Hochstein | G06N 20/00 |
| | | | | 706/46 |
| 2016/0062950 | A1* | 3/2016 | Brodersen | G06K 9/00 |
| | | | | 702/181 |
| 2018/0060666 | A1* | 3/2018 | Song | G06N 3/0454 |
| 2019/0130293 | A1* | 5/2019 | Singh | G06Q 10/04 |

OTHER PUBLICATIONS

Venkatraman et al., "Predictive-State Decoders: Encoding the Future into Recurrent Networks", Sep. 25, 2017, arXiv:1709.08520v1, pp. 1-11. (Year: 2017).*

* cited by examiner

*Primary Examiner* — Ying Yu Chen
(74) *Attorney, Agent, or Firm* — Nicholson De Vos Webster & Elliott LLP

(57) ABSTRACT

Techniques for forecasting using deep factor models with random effects are described. A forecasting framework combines the strengths of both classical and neural forecasting methods in a global-local framework for forecasting multiple time series. A global model captures the common latent patterns shared by all time series, while a local model explains the variations at the individual level.

20 Claims, 11 Drawing Sheets

$$\Pr(\{z_{i,T_i+1:T_i+\tau_i}\}_{i=1}^N | \{x_{i,T_i+1:T_i+\tau_i}\}_{i=1}^N, \{\mathcal{D}_i\}_{i=1}^N), \quad \mathcal{D}_i = \{(x_{1:T_i}, z_{1:T_i})\}, \quad (1)$$

$$h_t \sim \mathcal{N}(A_t h_{t-1}, \Sigma_\nu), \quad z_t \sim \mathcal{N}(C_t h_t, \Sigma_\epsilon), \quad (2)$$

$$z_{i,t} \sim p_\theta(\cdot | u_{i,t}), \quad u_{i,t} = w_{i,t} \cdot g_t \oplus r_{i,t}, \quad (3)$$

$$\log p(z) = \log \int p(z, u, h) \geq \mathbb{E}_{q_\phi(u,h)} \log \left[ \frac{p_\Theta(z, u, h)}{q_\phi(u, h)} \right] \quad (4)$$

$$= \mathbb{E}_{q_\phi(u)} \mathbb{E}_{p(h|a)} \log \left[ \frac{p(z|u) p(u, h)}{q_\phi(u) p(h|u)} \right] = \mathbb{E}_{q_\phi(u)} \left( \log \left[ \frac{p(z|u)}{q_\phi(u)} \right] + \mathbb{E}_{p(h|a)} \log \left[ \frac{p(u, h)}{p(h|u)} \right] \right) \quad (5)$$

$$= \mathbb{E}_{q_\phi(u)} \left( \log \left[ \frac{p(z|u)}{q_\phi(u)} \right] + \log p(u) \right) \approx \frac{1}{L} (\log p(z|\tilde{u}_j) + \log p(\tilde{u}_j) - \log q_\phi(\tilde{u}_j)), \quad (6)$$

$$z_{i,j,t} \sim p_\theta(\cdot | u_{i,j,t}), \quad u_{i,j,t} = \sum_{k=1}^K \nu_{i,t,k} \cdot g_{t,k} \cdot \xi_{j,t,k} = \nu_{i,t}^T G_t \xi_{j,t} + r_{i,j,t}, \quad (7)$$

*FIG. 4*

Algorithm 1 Training Procedure for Deep Factor Models with Random Effects.

1: for each time series $z_i$ in a mini-batch do
2:    Sample the estimated latent representation from the variational encoder $\tilde{u}_i \sim q_\phi(z_i)$.
3:    With the current estimate of the model parameters $\Theta$, calculate the local fluctuation based on the dynamic factor RNN $g_t$ and the attention network $s_t$, $\tilde{r}_i = \tilde{u}_i \ominus w_{i,t} \cdot g_t$, where $w_{i,t}$ is the output from the attention network and $\ominus$ means either subtraction or division.
4:    Accumulate the loss (negative marginal likelihood) for each time series given the estimate of the local fluctuation $r_i$, and take a gradient step with respect to $\Theta$, the parameters in recognition, global factor, and attention networks.
5: end for

*FIG. 5*

DEEP FACTOR MODELS WITH RANDOM EFFECTS FOR FORECASTING

BACKGROUND

The rapid growth of available time series data from many different sources poses unprecedented challenges for traditional forecasting models. Classical time series forecasting techniques excel at capturing the uncertainty of a small group of time series, but they struggle with many practically important aspects such as scalability, learning across time series, and the cold-start problem. Neural network-based methods have therefore recently received revived interests in forecasting, due to their abilities to address these shortcomings by extracting patterns across a large number of time series. However, neural network-based methods lack the ability to produce proper uncertainty estimation.

BRIEF DESCRIPTION OF DRAWINGS

Various embodiments in accordance with the present disclosure will be described with reference to the drawings, in which:

FIG. 4 is a diagram illustrating exemplary formulae involved for training and/or forecasting using deep factor models with random effects according to some embodiments.

FIG. 5 is a diagram illustrating an exemplary training procedure for deep factor models with random effects according to some embodiments.

DETAILED DESCRIPTION

Figure 1:
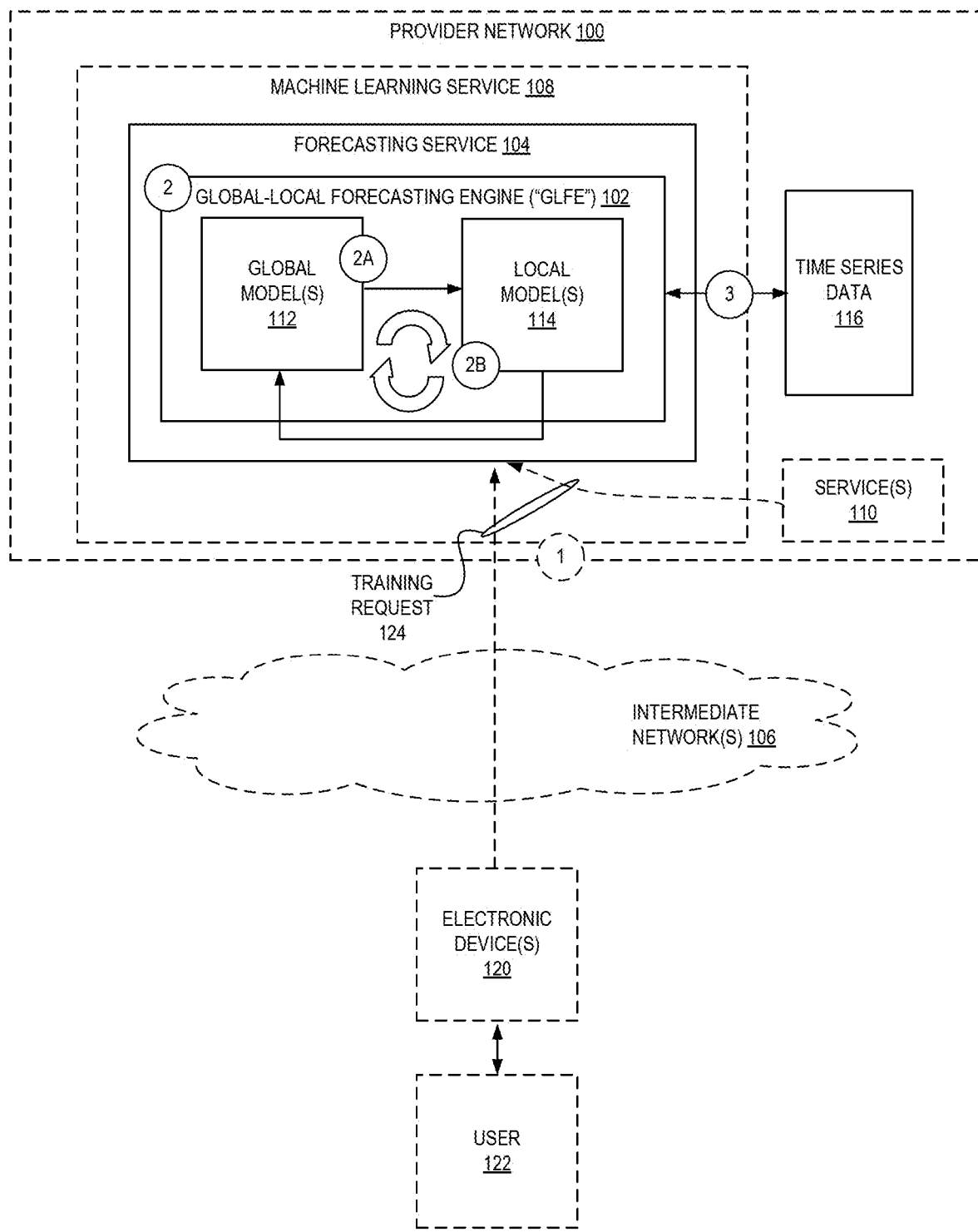
FIG. 1 is a diagram illustrating an exemplary environment for training deep factor models with random effects for forecasting according to some embodiments.

Various embodiments of methods, apparatus, systems, and non-transitory computer-readable storage media for forecasting via deep factor models with random effects are described. According to some embodiments, benefits from both classical and neural forecasting methods can be uniquely gained from a global-local framework for forecasting multiple time series. In some embodiments, a global model captures the common latent patterns shared by multiple time series, while the local model explains the variations at the individual level. Further, embodiments provide efficient inference algorithms that have been shown in empirical studies to be particularly effective and thereby validate the approach.

In the statistics and econometrics communities, the prevalent forecasting methods in use today have been developed in the setting of forecasting individual or small groups of time series with complex models designed and tuned by domain experts. Recent years have witnessed a paradigm shift in forecasting techniques and applications, from model- and assumption-based to data-driven and fully automated. This shift can be attributed to the availability of large, rich, and diverse time series data corpora. Examples include forecasting the energy consumption of (many) individual households, forecasting the load for all servers in a data center, or forecasting the demand for all products that a large retailer offers.

With regard to time series in large inventories, in typical scenarios a substantial amount of data on past behavior of similar, related time series (e.g., energy consumption of other households, load for related servers, demand for similar products as well as co-variates such as price, holidays or promotions) can be leveraged for making a forecast for an individual time series. Using data from related time series not only allows fitting more complex (and hence potentially more accurate) models without overfitting, it can also alleviate the time and labor intensive human selection and preparation of co-variates and model selection steps required by classical techniques.

Classical time series techniques such as ARIMA(X), exponential smoothing, or general Bayesian time series techniques excel at modeling the complex dynamics of individual time series of sufficiently long history. Another major advantage of the model-based approach is the capability of providing uncertainty estimate with probabilistic forecast, which is crucial for downstream decision making. However, these approaches are local, i.e., they learn one model per time series, so they cannot effectively extract information across time series—and in particular—struggle with cold start problems in which sufficient previous history may not exist.

On the other end of the spectrum, deep neural networks (DNNs) have been applied in other areas of machine learning with groundbreaking success. However, while DNNs are generally good at extracting patterns across time series, they do not properly model uncertainty or allow for efficient structural inference.

Thus, for time series forecasting, it would be extremely beneficial to find a way to effectively combine the benefits of classical structural time series models with the benefits of data-driven neural networks in a principled manner Thus, embodiments disclosed herein introduce a new global-local forecasting framework (referred to herein as "Deep Factor Model with Random Effects"), which is based on DNN and probabilistic graphical models. Embodiments can effectively extract complex non-linear patterns globally while capturing individual random effects for each time series locally.

In some embodiments each time series, or its latent function for non-Gaussian data, can be represented as a sum of a global time series and a corresponding local model. The global part is given by a linear combination of a set of deep dynamic factors where the loading is temporally determined by attentions. The local model is stochastic, and typical choices include white noise processes, linear dynamical systems (LDS) or Gaussian processes (GPs). The stochastic local component allows for the uncertainty to propagate forward in time. A variational Auto-Encoder (VAE) framework enables efficient inference by decoupling the non-Gaussian emissions with the individual latent dynamics. Furthermore, embodiments extend the proposed frame to cover spatio-temporal forecasting scenarios by extending the dynamical latent factors to temporal matrices, where the global part admits a bilinear structure.

Thus, embodiments disclosed herein provide a new global-local framework for time series forecasting that can learn both across a large collection of time series and at the same time can generalize from small data sizes. The framework described herein can be can be flexibly implemented in a variety of ways in different environments, such as via use of recurrent neural networks (RNNs) and State-space models (SSMs). Further, various embodiments described herein avoid existing technological problems of other forecasting systems under particular conditions, such as the existence of non-Gaussian observations, missing data, censored output and/or spatio-temporal forecast with cold-start.

FIG. 1 is a diagram illustrating an exemplary environment for training deep factor models with random effects for forecasting according to some embodiments. In FIG. 1, a global-local forecasting engine 102 (or "GLFE")—which may be implemented as software, hardware, or a combination of both—may be part of a forecasting service 104, which could be implemented in a provider network 100 (e.g., optionally via use of a machine learning service 108).

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Figure 2:
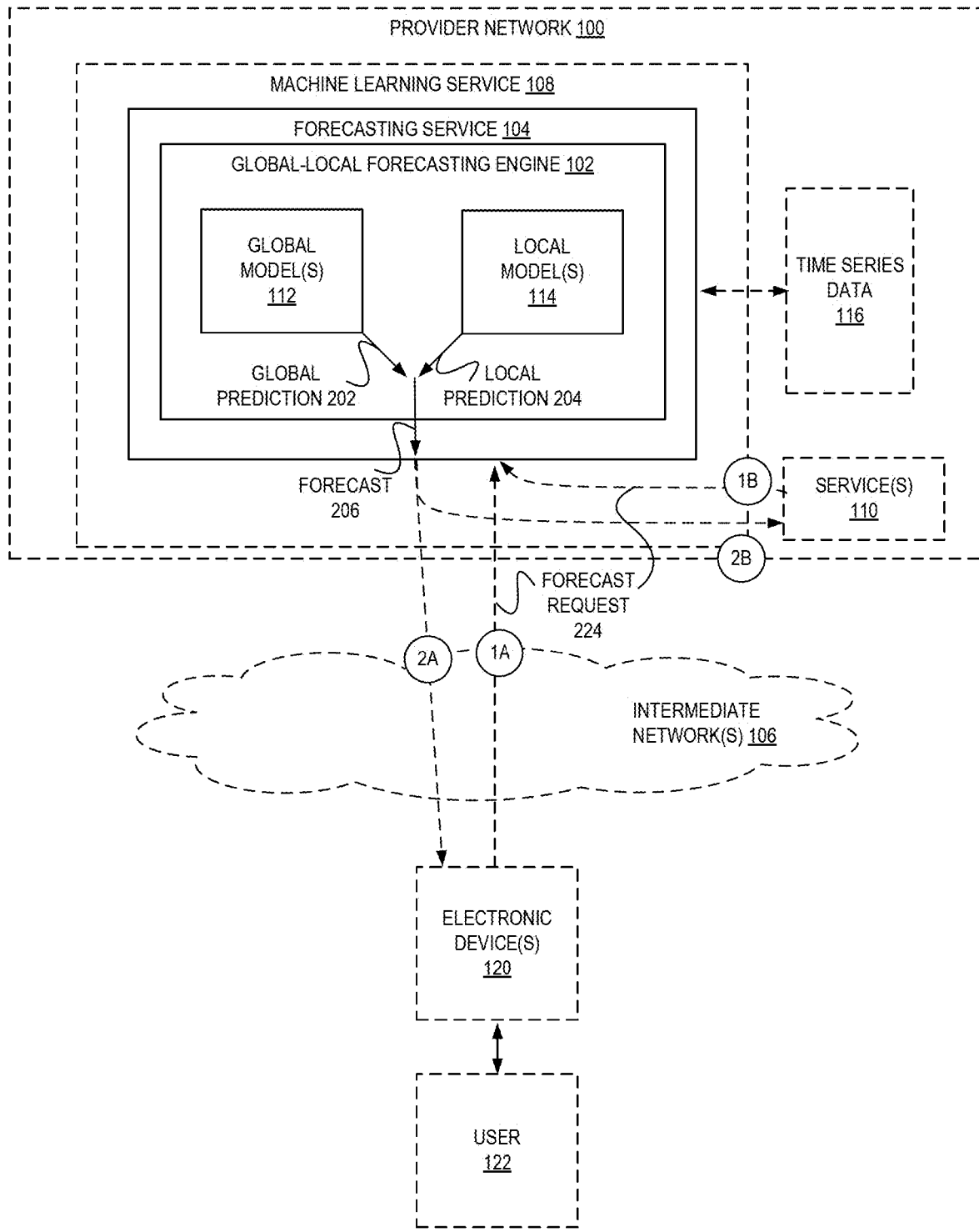
FIG. 2 is a diagram illustrating an exemplary environment for forecasting using deep factor models with random effects according to some embodiments.

The GLFE 102 may be implemented in whole or in part within a machine learning service 108 for training and/or forecasting. As will be described later herein, a machine learning service 108 may allow other entities (e.g., services, users) to train machine learning models and/or execute machine learning models as a service, such as via use of Hypertext Transfer Protocol (HTTP) requests issued to an endpoint associated with the machine learning service 108 (e.g., in a provider network 100). For example, at optional circle (1), an electronic device 120 of a user 122 and/or another service 110 (or application/system) within or outside a provider network 100 may issue a request 124 to train (or utilize, via a forecast request 224 depicted in FIG. 2) models of a global-local forecasting engine 102.

At circle (2), the GLFE 102 trains (and thereafter, utilizes) one or more global models 112 together with one or more local models 114. The training may be performed according to an interactive process as described herein, e.g., illustrated using circle (2A) and then (2B), followed by one or more iterations also including circle (2A) and (2B), and so on. The global model(s) 112 can be trained to capture trends in time series data 116 that appear "globally" across many different entities' time series, and the local model(s) 114 can capture "local" patterns in time series data that are specific to a particular entity. The time series data 116 may be stored within a provider network (e.g., within a storage service) or outside the provider network, and may be identified (e.g., via a URL) in the request to perform a training. Thus, embodiments can find driving factors using the global model(s) 112 to capture global patterns (e.g., holiday effects) and then capture the uncertainty around the fluctuation around certain entities using the local model(s) 114. Thereafter, as reflected in FIG. 2, upon the submission of a request 224 to generate a forecast (e.g., at circle (1A) and/or circle (1B), which may identify the particular entity to be forecasted for, a particular time or time period/window for the forecast, etc.), the GLFE 102 can use the global model(s) 112 to generate a global prediction 202 and the local model(s) 114 to generate a local prediction 204 that together may be combined (e.g., via addition/sum) the yield a forecast 206. The forecast 206 may include one or more predicted values for a requested time period, and optionally can be provided back to the electronic device 120 at circle (2A), another service/application at circle (2B), stored in a data store, etc.

The GLFE 102 can then combine this data—e.g., by summing it together—to create a time series forecast.

In some embodiments, the global model(s) 112 includes the use of a neural network to model the global trend, and the local model(s) 114 utilize a probabilistic model to model the local trend. Embodiments can utilize both types of models together by overcoming the technical challenge in how to provision and train both pieces, and how to choose particular models to train or do inference fast. In some embodiments, the latent variable that is estimated on is decomposed. With these decoupled, embodiments can train them separately, and a special algorithm can be utilized to do much faster training as described later herein.

Thus, for all of the time series under consideration, embodiments iteratively, based on the global model(s) 112, determine a rough estimate of what the global patterns would be (e.g., for product sales time series data, it may be the case that December of every year has a sales spike). Embodiments then subtract these global patterns from a particular entity's time series, leaving residuals. By removing these global patterns from the time series data of a particular entity, specific local fluctuations are thus "left over." The local model(s) 114 may then use the local model to attempt to fit the residuals—that is, attempt to find a best probabilistic model to explain the remaining part, that is, what is the pattern of the remaining data. From this adjusted local model(s) 114, the process continues back—based on the best local model, the global model(s) 112 are re-estimated, and then the process iterates. Thus, this process—similar to some neural network operations—can start with a guess of the global pattern, and then a determination is made as to how good it is, and then a determination is made as to how good the remaining part (the "residual") is captured by the local models, to get a final "score." This process can thus be iterated upon—that is, the adjustment of the global and local models—until the "error" (e.g., loss) converges (e.g., to a minimum), a number of iterations has occurred, a threshold error is passed, etc.

More formally as background, let $\chi \subset \mathbb{R}$ denote the input features space and $\mathcal{Z} \subset \mathbb{R}$ the space of the observations. A set of N time series are assumed with the i-th time series being of $(x_{i,t}, z_{i,t}) \in \chi \times \mathcal{Z}$, , t=1, . . . , $T_i$, where $x_{i,t}$ are the input co-variates and $z_{i,t}$ is the corresponding observation at time t. Given a forecast horizon $T_f \in \mathbb{N}^+$, embodiments goal is to calculate the joint distribution of future observations as provided by equation (1) in FIG. 4. (FIG. 4 is a diagram illustrating exemplary formulae involved for training and/or forecasting using deep factor models with random effects according to some embodiments.)

The shorthand notation 1:T is used to denote $\{1, 2, \ldots, T\}$. For the sake of concreteness and simplicity of explanation, this example is restricted to a univariate time series (k=1), though embodiments are not so limited. Additionally, the index of the time series i is hereby dropped when it is implied by the context.

Classical time series techniques learn different models for each i, often using ARIMA or a certain form of state-space models (SSMs), which subsumes exponential smoothing models. More related to the present work is SSM, in particular, linear dynamical system (LDS) as shown in equation (2) of FIG. 4, where $z_t$ is the observation at time t, $h_t$ is the latent state at time t, and $A_t$, $C_t$ are transition and emission matrices with $\Sigma_{ij}$, $\Sigma_\epsilon$ being the covariance matrices respectively. The first equation is referred to as a transition equation because it describes the dynamics of the latent process, and the second equation is referred to as an emission equation because it associates the latent variable $h_t$ with the observation $z_t$. The Kalman filter (KF) provides inference as well as the marginal likelihood $p(z_{1:T})$.

A variational autoencoder (VAE) generalizes the latent variable model $p_\theta(z_t, h_t) = p_\theta(z_t|h_t)\pi(h_t)$ where $h_t$ is normally assumed to be Gaussian. As the inference, calculating $p(h_t|z_t) \propto p_\theta(z_t|h_t)$ is normally intractable; however, using variational inference, the inference problem becomes an optimization problem to find the best variational distribution $q_\phi(h_t)$ in a user-defined function space. A key idea of VAE is to use neural networks to parameterize both the observation models $p_\theta(z_t|h_t)$ and the variational distribution $q_\phi(h_t)$, and they are learned jointly to maximize a stochastic approximation of the evidence lower bound (ELBO). The NN-parametrized variational distribution can be called an inference network or recognition network.

Dynamic factor model (DFM) is an extension of principal component analysis (PCA) in the temporal setting. It is assumed that all the time series are driven by a small number of dynamic factors (latent) and each time series is a linear combination of the dynamic factors while the residual for each time series is assumed to be white noise (uncorrelated along time).

Figure 3:
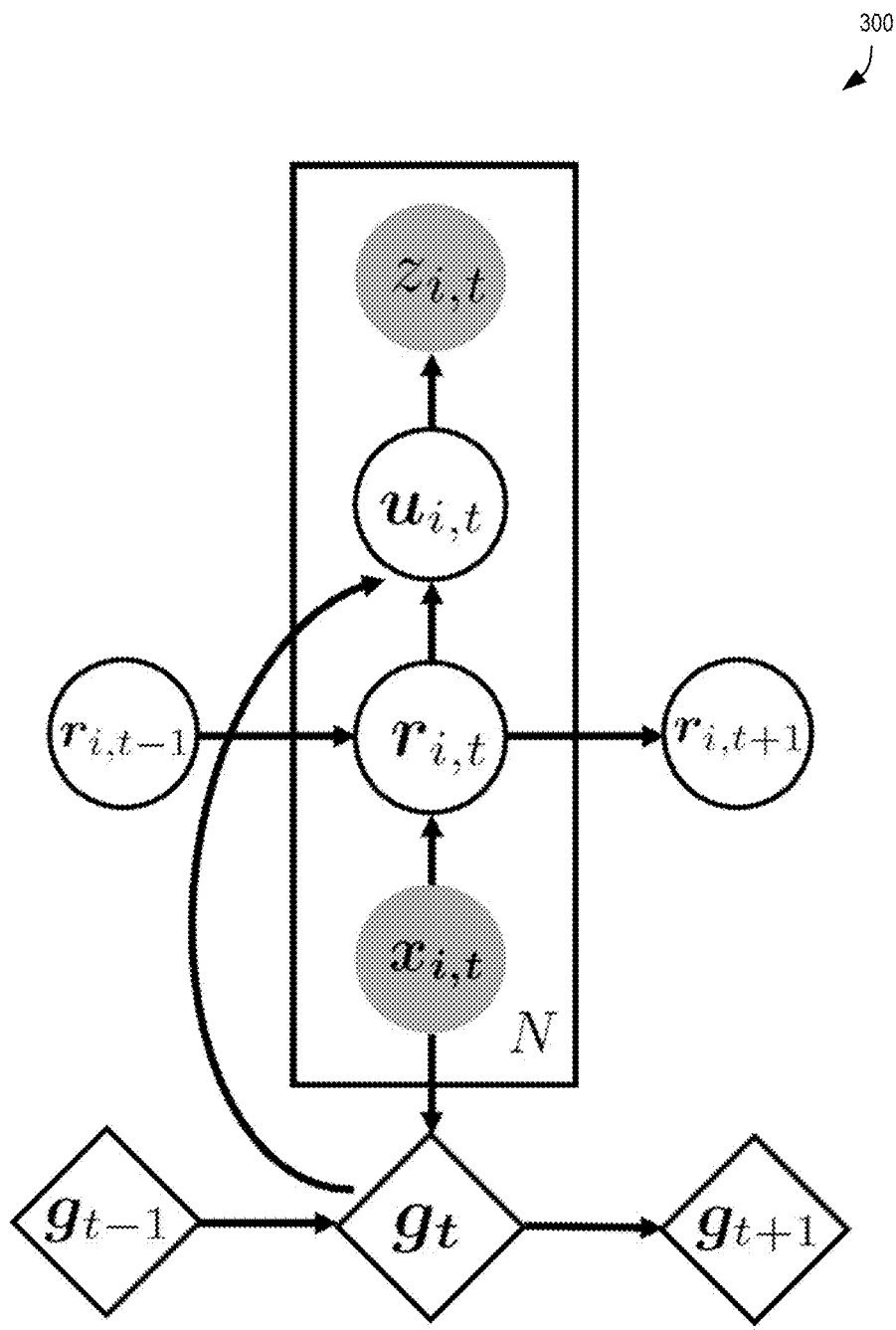
FIG. 3 is a diagram illustrating an exemplary generative model for forecasting using deep factor models with random effects according to some embodiments.

With this background, the Deep Factor Model with Random Effects can be more completely described. First, the generative model is illustrated in FIG. 3 via a plate graph depicting a deep factor model with random effects, where each diamond node denotes a deterministic state.

More formally, in some embodiments, it is assumed that each time series $z_{i,1:T_i}$ is governed by two components: global patterns and local fluctuations.

Regarding global patterns, there are K latent global (deep) factors $g_{k,t}$, which could be thought as dynamic principal components or eigen time series that drive the underlying dynamics. Then, regarding local fluctuations, each time series has its own probabilistic model $\mathcal{R}_i$ accounting for the random effects $r_{i,t}$, which could be any classical probabilistic time series model, and in some embodiments preferably the ones with normal distributed observation assumption, in that their marginal likelihood $\Pr(z_{i,1:T_i}, \mathcal{R}_i)$ typically can be efficiently computed. Two such examples include LDS and Gaussian processes.

The observed value $z_{i,t}$ at time t or more generally, its latent function $u_{i,t}$ such that $z_{i,t} \sim p_\theta(\cdot|u_{i,t})$, can be written as a sum of the weight average of the global patterns and its local fluctuations. The general framework of the generative process can be written as shown in equation (3) in FIG. 4, where $\oplus$ denotes either addition or multiplication. The observation model $p_\theta$ is either known (such as Gaussian, Poisson, etc.) or can be parameterized by an NN within the VAE framework.

In various embodiments, one or more of the following three types of NNs can be involved.

Deep dynamic factors. Embodiments have a global RNN (or a set of k univariate-valued RNNs) learned globally to capture the common patterns from all time series.

Attention network. For each time series at time t, embodiments assign attentions to the dynamic factors, which determines the group of the global factors to focus on as well as the most relevant segment of histories. At a high level, the dynamic weighting gives temporal local attention to different global factors (or dynamic loadings in DFM language).

VAE: recognition network. The third NN is related to the inference of the latent variables $H=\{u_i, h_i\}$ where $h_i$ is the latent variables in local probabilistic time series model $\mathcal{R}_i$. In the example of LDS, $h_i$ is all the latent states $l_{i,1:T_i}$. Embodiments use the recognition network, or variational decoder, to find the optimal variational Gaussian approximation $q_\phi(H|\mathcal{D})$ to the true posterior distribution $p(H|\mathcal{D})$. In most of the forecasting cases where the likelihood is known in advance, there is no need for the generation network. However, if the data generation process is parametrized by an NN, $p_{nn}(z|u)$, whose parameters, the same as the recognition network, are shared by all time series. Note that in embodiments using LDS, or Gaussian latent variable models (or GPs) as local models and the observation is Gaussian, there is no need for the approximate inference, thus the recognition is no longer needed.

Several concrete models of this framework are now summarized.

Variational LDS: LDS as the local model with no global factor. If there are no global factors and we choose a local LDS to be the innovation state-space models (ISSM), embodiments arrive at a more general version of the Bayesian state-space models proposed in other works. Instead of the using the Laplace approximation which requires careful treatment for different likelihood functions, the recognition network provides a unified solution and yields a better estimate of the posterior by sharing information (by using the same set of NN parameters) among different time series. The use of the NNs to encode the variational approximation opens the door for more complex likelihood functions and censored outputs, which is technically challenging with techniques used in other systems but is more straightforward in these embodiments disclosed herein.

DF-RNN: In some embodiments, an RNN is used as the local model with shared parameters. In this case, there are no latent variables to performance probabilistic inference over and the recognition network is no longer needed. The only source of stochasticity comes from the emission probability, which, similar to another system DeepAR, lacks the ability to propagate uncertainty forward in time. The training is similar as for standard RNNs. However, because this structure does not need expensive inference, it has computational advantages and serves as the first stage of the training procedure.

DF-GRNN: In some embodiments, a Gaussian noise process is used as the local model. This is a simple case that concerns all three NNs. With white noise as the local model $r_{i,t} \sim \mathcal{N}(0,1)$, the generative model is a naive Gaussian latent variable model and latent variables are simply the (standard normal) innovations for each time series at each step. Nevertheless, in the presence of non-Gaussian likelihoods, approximate inference is still needed, which in this case, can be handled by the recognition network. Another quite useful version of this model is a combination with DF-RNN assuming that the noise in the latent space is generated such that $r_{i,t} \sim \mathcal{N}(0, \sigma_{i,t}^2)$ with $\sigma_{i,t}^2$ given by an RNN.

DF-LDS: In some embodiments, LDS is used as the local model. For the LDS, embodiments consider level-trend ISSM as the default option, which shows robust and solid performance in real-world applications [24] in spite of its simplicity. The main reason behind this is that global factors with attention will likely explain the majority of the dynamics of the time series such as trend and seasonality, which avoids the burden to hand design the latent states of the ISSM.

For further detail regarding inference learning, suppose that N time series exist that are generated with formulation (3) of FIG. 4. The goal is to learn the parameters, denoted by $\Theta\{\beta,\gamma,\phi\}$ of the global RNNs, recognition network, and the attention network respectively as well as estimating the latent variables $H=\{u_i, h_t\}$. Note that the global factors are deterministic, thus no inference is needed. To simplify exposition, the index of the individual time series i is dropped. Thus, we wish to optimize a variational lower bound of the marginal likelihood of time series $z=z_{1:T_z}$ in equation (4) of FIG. 4.

To this end, resorting to stochastic gradient variational Bayes, where the expectation in equation (4) is replaced by Monte-Carlo samples. For the variational distribution $q_\phi(\cdot)$, we consider structural approximation, using the following variational posterior to approximate the true posterior $p_\phi(h, u|z)$, $q_\phi(h,u|z)=q_\phi(u|z)p(h|u)=\Pi_t q_\phi(u_t|z_t)p(h|u)$. The key of this variational form is to make the second term coming from the exact conditional posterior from the probabilistic model $\mathcal{R}_i$ such that given u, the inference becomes a standard inference problem with $\mathcal{R}_i$. For the first term, we use a neural network to parametrize $q_\phi(h|z)$. Note that only the first term depends on the observations z. In the following, the conditioning is dropped for cleaner notation. Next, the (stochastic) variational lower bound (4) is calculated, which can be written as equations (5) and (6) in FIG. 4, with $\tilde{u}_j \sim q_\phi(u)$, j=1, . . . , L being sampled from the recognition network. The first term gives rise to the likelihood of the observation, while the last term serves as a regularizer. The second term is the marginal likelihood from the local time series model $\mathcal{R}_i$. Denote the vector of the global part to Be μ. If LDS is used as the local model, the marginal likelihood log $p(\tilde{u}_j)$=log $p(\tilde{u}_j \ominus \mu)$ is readily computed by KF where $\ominus$ is subtraction or division. For zero-mean Gaussian process (GP) as the local model, the marginal likelihood is given by $\mathcal{N}(\tilde{u} \ominus \omega_t \cdot g_t, K)$ with K to be the kernel matrix. It is important to have efficient inference at the local level, given that one normally needs to learn from a large collection of time series. Bound (6) of FIG. 4 differs from the ELBO in other systems, which is essentially the stochastic estimation of (5), such that sampling h is avoided and the variance coming from the MC estimate of the second integral is eliminated.

In various embodiments, flexibly, there are different NN structures to choose from for the variational encoder $q_\phi(h|z)$. In particular, some embodiments choose the bi-directional LSTM, given that it considers information from both the past and the future, in a similar fashion as the backwards message in the Kalman smoother. Notably, the recognition network may only be used in the training phrase to better approximate the posterior distribution of the latent function values. Thus, there is no information leak for the desired forecasting use case.

Finally, the full training procedure can be described, which proceeds as follows as shown in FIG. 5. In line 1, for each time series in a mini batch, lines 2-4 are performed. Line 2 includes sampling the estimated latent representation from the variational encoder. Line 3 includes, with the current estimate of model parameters, calculating the local fluctuation based on the dynamic factor RNN and the attention network. Line 4 includes accumulating the loss (negative marginal likelihood) for each time series given the estimate of the local fluctuation, and taking a gradient step with respect to the model parameters in the recognition, global factor, and attention networks.

An example with regard to performing spatio-temporal forecasting is now provided. For example, when considering a sales prediction for a retail company, it is desirable to have a refined spatio-temporal forecast to better assist the optimization of the supply chain. The goal of the spatio-temporal forecast may thus be to predict $z_{i,j,t}$, the value of time series i for geolocation j at time t. The framework disclosed herein can be extended to place the K global factors $g_{k,t}$ on the diagonal of a K×K matrix, forming a tensor of global RNNs $G_t \in \mathbb{R}^{K \times K}$ One more attention network can be added such that the twin attention networks take into account the attributes (or the embeddings) of the geo-locations and the products, and output $v_{i,t}$ and $\xi_{j,t}$, both of dimension K. The latent spatio-temporal time series values admit a bilinear structure and we have the following generative process as shown in equation (7) of FIG. 4, where each item-geolocation pair (i,j) has its own random effects $r_{i,j,t}$. Upon being familiar with probabilistic tensor factorization, recognize that, without the random effects and the temporal perspective, equation (7) of FIG. 4 is a temporal extension of the probabilistic CP decomposition with RNNs.

Accordingly, within the framework disclosed herein, another novel model is arrived upon for probabilistic recurrent tensor factorization. Note that, similar as equation (3), there are different types of local model, embodiments extend DF-RNN to the tensor case with name TDF-RNN. Notably, there is no constraint to restrict $G_t$ to be diagonal or square, and one could choose full K×L matrices with matching attention dimensions. In doing this, at a high level, embodiments are using $G_t$ to approximate the core tensor of the observed time series tensor (product by geolocation by time), yielding recurrent probabilistic Tucker decomposition.

Handling count and intermittent data. For forecasting the inventory of a large catalog, one is often faced with highly erratic, intermittent, or bursty data that violates core assumptions of many classical techniques such as Gaussian errors, stationarity or homoscedasticity of the time series. Such issues are not a problem for the embodiments disclosed herein.

Missing data and censored output. To motivate this practical forecasting issue, consider the retail demand forecasting case. When a certain product goes out of stock (OOS), its sales only reveal a fraction of the true demand A principal approach is to integrate the missing demand out, but it is difficult to perform inference even in the simplest case of Gaussian. However, based on the recognition network, embodiments can do this easily by substituting the log-likelihood term with the complement cumulative distribution function.

The framework disclosed herein differs from prior systems in that embodiments "marry" the use of classical probabilistic models with deep learning techniques, resulting in a more general and powerful framework with scalable inference. Further, embodiments are probabilistic in nature and can provide uncertainty estimation for non-Gaussian observations. Furthermore, embodiments can handle time series with different lengths while one needs to do back filling to apply other techniques such as MF.

Figure 6:
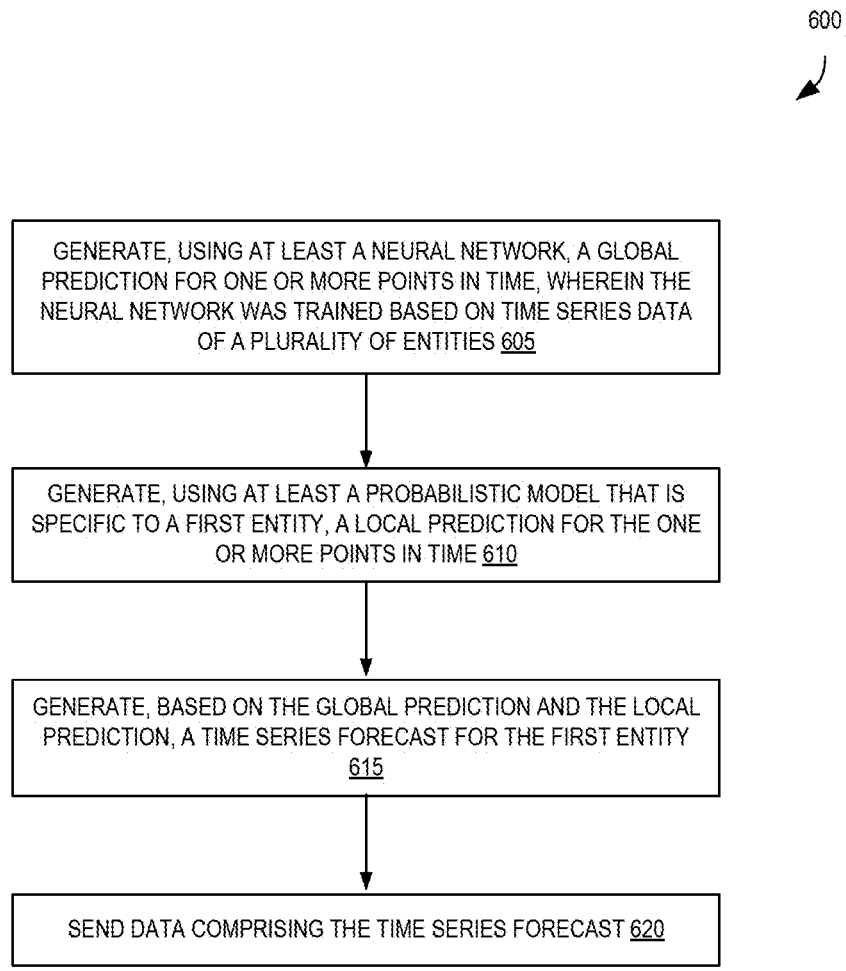
FIG. 6 is a flow diagram illustrating operations of a method for forecasting via deep factor models with random effects according to some embodiments.

FIG. 6 is a flow diagram illustrating operations 600 of a method for forecasting via deep factor models with random effects according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the GLFE 102 (or forecasting service 104, machine learning service 108, or provider network 100) of the other figures.

The operations 600 include, at block 605, generating, using at least a neural network, a global prediction for one or more points in time, wherein the neural network was trained based on time series data of a plurality of entities. In some embodiments, the neural network comprises a recurrent neural network. In some embodiments, the neural network further comprises at least one of: an attention network or a recognition network. In some embodiments, the plurality of entities comprises a plurality of products and the time series data of the plurality of entities comprises amounts of sales of the plurality of products.

The operations 600 include, at block 610, generating, using at least a probabilistic model that is specific to a first entity, a local prediction for the one or more points in time.

In some embodiments, the probabilistic model is a state-space model (SSM), and in some embodiments the SSM comprises a linear dynamical system (LDS).

The operations 600 include, at block 615, generating, based on the global prediction and the local prediction, a time series forecast for the first entity. In some embodiments, the generating includes adding the global prediction and the local prediction, though in some embodiments the generating includes multiplying the global prediction and the local prediction.

The operations 600 include, at block 620, sending data comprising the time series forecast. The data may be sent to an electronic device of a user (e.g., that requested the forecast), to another system or service, etc.

Optionally, before block 605, the operations 600 further include receiving, at a web service endpoint of a provider network, a request to generate the time series forecast for the first entity, wherein the request was originated by an electronic device of a user, and wherein sending data comprises sending the data to the electronic device.

Optionally, before block 605, the operations 600 further include training the neural network and the probabilistic model, wherein the training includes using an iterative process. In some embodiments, the training includes generating, using the neural network, a first one or more global patterns based on the time series data of the plurality of entities; generating, based on subtracting the first one or more global patterns from time series data of the first entity, a set of residuals; and adjusting the probabilistic model to attempt to fit the set of residuals. In some embodiments, wherein the training further includes after adjusting the probabilistic model, adjusting the neural network based at least in part on the adjusted probabilistic model.

Figure 7:
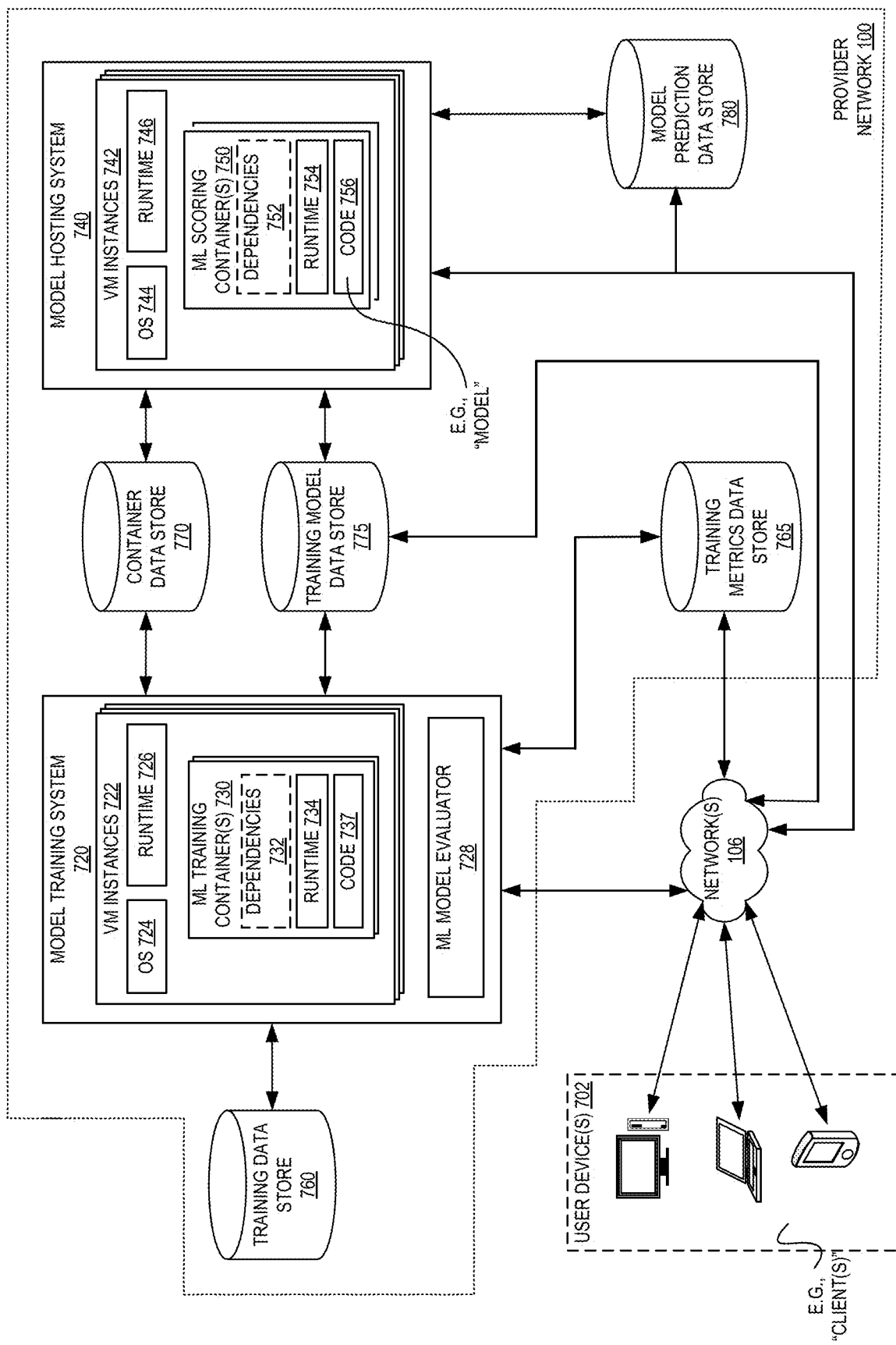
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (e.g., electronic devices(s) 120), a model training system 720, a model hosting system 740, a training data store 760, a training metrics data store 765, a container data store 770, a training model data store 775, and a model prediction data store 780.

A machine learning service described herein may include one or more of these entities, such as the model hosting system 740, model training system 720, etc.

In some embodiments, users, by way of user devices 702, interact with the model training system 720 to provide data that causes the model training system 720 to train one or more machine learning models. A machine learning model, generally, may be thought of as one or more equations that are "trained" using a set of data. In some embodiments, the model training system 720 provides ML functionalities as a Web service, and thus messaging between user devices 702 and the model training system 720 (or provider network 100), and/or between components of the model training system 720 (or provider network 100), may utilize HTTP messages to transfer data in a machine-readable file format, such as eXtensible Markup Language (XML) or JavaScript Object Notation (JSON).

The user devices 702 can interact with the model training system 720 via frontend 729 of the model training system 720. For example, a user device 702 can provide a training request to the frontend 729 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 702, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 702 may provide, in the training request, an algorithm written in any programming language. The model training system 720 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (e.g., an interactive web-based programming environment) and cause the algorithm/code to be provided—perhaps as part of a training request (or referenced in a training request)—to the model training system 720, where this algorithm/code may be containerized on its own or used together with an existing container having a machine learning framework, for example.

In some embodiments, instead of providing a container image in the training request, the user device 702 provides, in the training request, an indicator of a container image (e.g., an indication of an address or a location at which a container image is stored). For example, the container image can be stored in a container data store 770, and this container image may have been previously created/uploaded by the user. The model training system 720 can retrieve the container image from the indicated location and create a container using the retrieved container image. The container is then loaded into a virtual machine instance 722 for training a machine learning model, as described in greater detail below.

The model training system 720 can use the information provided by the user device 702 to train a machine learning model in one or more pre-established virtual machine instances 722 in some embodiments. In particular, the model training system 720 includes a single physical computing device or multiple physical computing devices that are interconnected using one or more computing networks (not shown), where the physical computing device(s) host one or more virtual machine instances 722. The model training system 720 can handle the acquisition and configuration of compute capacity (e.g., containers, instances, etc., which are described in greater detail below) based on the information describing the computing machine on which to train a machine learning model provided by the user device 702. The model training system 720 can then train machine learning models using the compute capacity, as is described in greater detail below. The model training system 720 can automatically scale up and down based on the volume of training requests received from user devices 702 via frontend 729, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (e.g., task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (e.g., creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (e.g., the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (e.g., execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 720 uses one or more container images included in a training request (or a container image retrieved from the container data store 770 in response to a received training request) to create and initialize a ML training container 730 in a virtual machine instance 722. For example, the model training system 720 creates a ML training container 730 that includes the container image(s) and/or a top container layer.

Prior to beginning the training process, in some embodiments, the model training system 720 retrieves training data from the location indicated in the training request. For example, the location indicated in the training request can be a location in the training data store 760. Thus, the model training system 720 retrieves the training data from the indicated location in the training data store 760. In some embodiments, the model training system 720 does not retrieve the training data prior to beginning the training process. Rather, the model training system 720 streams the training data from the indicated location during the training process. For example, the model training system 720 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (e.g., a buffer storing the retrieved portion is nearly empty), then the model training system 720 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (e.g., coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 720 as input parameters to some or all of the instructions being executed.

In some embodiments, executing the executable instructions causes the virtual machine instance 722 (e.g., the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 720 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 720 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (e.g., information indicating that N ML training containers 730 are collectively training a machine learning model and that a particular ML training container 730 receiving the configuration information is ML training container 730 number X of N), which can be included in the resulting model data. By parallelizing the training process, the model training system 720 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 720 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 720 can further provide configuration information to each ML training container 730 via the virtual machine instances 722 (e.g., information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 720 can significantly reduce the training time in some embodiments.

In some embodiments, the model training system 720 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 720 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (e.g., known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 702, can transmit a request to the model training system 720 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 720 can modify the machine learning model accordingly. For example, the model training system 720 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 720 can cause the virtual machine instance 722 to modify the execution of code stored in an existing ML training container 730 according to the data provided in the modification request. In some embodiments, the user, via the user device 702, can transmit a request to the model training system 720 to stop the machine learning model training process. The model training system 720 can then instruct the virtual machine instance 722 to delete the ML training container 730 and/or to delete any model data stored in the training model data store 775.

As described below, in some embodiments, the model data stored in the training model data store 775 is used by the model hosting system 740 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (e.g., rapid initialization of machine learning model training in ML training container(s) 730) in response to training requests.

In some embodiments, the model training system 720 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model hosting system 740, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 740 includes a single physical computing device or multiple physical computing devices that are interconnected using one or more computing networks (not shown), where the physical computing device(s) host one or more virtual machine instances 742. The model hosting system 740 can handle the acquisition and configuration of compute capacity (e.g., containers, instances, etc.) based on demand for the execution of trained machine learning models. The model hosting system 740 can then execute machine learning models using the compute capacity, as is described in greater detail below. The model hosting system 740 can automatically scale up and down based on the volume of execution requests received from user devices 702 via frontend 749 of the model hosting system 740, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (e.g., task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (e.g., creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (e.g., supporting software such as libraries) needed by the code 756 in some embodiments. The runtime 754 can be defined by one or more executable instructions that form at least a portion of a container image that is used to form the ML scoring container 750 (e.g., the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (e.g., predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 740 uses one or more container images included in a deployment request (or a container image retrieved from the container data store 770 in response to a received deployment request) to create and initialize a ML scoring container 750 in a virtual machine instance 742. For example, the model hosting system 740 creates a ML scoring container 750 that includes the container image(s) and/or a top container layer.

As described above, a user device 702 can submit a deployment request and/or an execution request to the model hosting system 740 via the frontend 749 in some embodiments. A deployment request causes the model hosting system 740 to deploy a trained machine learning model into a virtual machine instance 742. For example, the deployment request can include an identification of an endpoint (e.g., an endpoint name, such as an HTTP endpoint name) and an identification of one or more trained machine learning models (e.g., a location of one or more model data files stored in the training model data store 775). Optionally, the deployment request also includes an identification of one or more container images stored in the container data store 770.

Upon receiving the deployment request, the model hosting system 740 initializes ones or more ML scoring containers 750 in one or more hosted virtual machine instance 742. In embodiments in which the deployment request includes an identification of one or more container images, the model hosting system 740 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 740 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 740 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 740 retrieves the identified model data file from the training model data store 775 and inserts the model data file into a single ML scoring container 750, which forms a portion of code 756. In some embodiments, the model data file is archived or compressed (e.g., formed from a package of individual files). Thus, the model hosting system 740 unarchives or decompresses the model data file to obtain multiple individual files and inserts the individual files into the ML scoring container 750. In some embodiments, the model hosting system 740 stores the model data file in the same location as the location in which the model data file was stored in the ML training container 730 that generated the model data file. For example, the model data file initially was stored in the top container layer of the ML training container 730 at a certain offset, and the model hosting system 740 then stores the model data file in the top container layer of the ML scoring container 750 at the same offset.

In embodiments in which multiple model data files are identified in the deployment request, the model hosting system 740 retrieves the identified model data files from the training model data store 775. The model hosting system 740 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 740 associates the initialized ML scoring container(s) 750 with the endpoint identified in the deployment request. For example, each of the initialized ML scoring container(s) 750 can be associated with a network address. The model hosting system 740 can map the network address(es) to the identified endpoint, and the model hosting system 740 or another system (e.g., a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 740 via the frontend 749, where the execution request identifies an endpoint and includes an input to a machine learning model (e.g., a set of input data). The model hosting system 740 or another system (e.g., a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 740 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (e.g., if no more trained machine learning models are needed to generate an output) or transmit the second output to a third ML scoring container 750 initialized in the same or different virtual machine instance 742 (e.g., if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (e.g., rapid initialization of ML scoring container(s) 750, rapid execution of code 756 in ML scoring container(s), etc.) in response to deployment and/or execution requests.

In some embodiments, the model hosting system 740 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model training system 720, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 720 and the model hosting system 740 depicted in FIG. 7 are not meant to be limiting. For example, the model training system 720 and/or the model hosting system 740 could also operate within a computing environment having a fewer or greater number of devices than are illustrated in FIG. 7. Thus, the depiction of the model training system 720 and/or the model hosting system 740 in FIG. 7 may be taken as illustrative and not limiting to the present disclosure. For example, the model training system 720 and/or the model hosting system 740 or various constituents thereof could implement various Web services components, hosted or "cloud" computing environments, and/or peer-to-peer network configurations to implement at least a portion of the processes described herein. In some embodiments, the model training system 720 and/or the model hosting system 740 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 720. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 740. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 720 and the model hosting system 740, this is not meant to be limiting. For example, in some embodiments not shown, the training data store 760 is located internal to at least one of the model training system 720 or the model hosting system 740.

In some embodiments, the training metrics data store 765 stores model metrics. While the training metrics data store 765 is depicted as being located external to the model training system 720 and the model hosting system 740, this is not meant to be limiting. For example, in some embodiments not shown, the training metrics data store 765 is located internal to at least one of the model training system 720 or the model hosting system 740.

The container data store 770 stores container images, such as container images used to form ML training containers 730 and/or ML scoring containers 750, that can be retrieved by various virtual machine instances 722 and/or 742. While the container data store 770 is depicted as being located external to the model training system 720 and the model hosting system 740, this is not meant to be limiting. For example, in some embodiments not shown, the container data store 770 is located internal to at least one of the model training system 720 and the model hosting system 740.

The training model data store 775 stores model data files. In some embodiments, some of the model data files are comprised of a single file, while other model data files are packages of multiple individual files. While the training model data store 775 is depicted as being located external to the model training system 720 and the model hosting system 740, this is not meant to be limiting. For example, in some embodiments not shown, the training model data store 775 is located internal to at least one of the model training system 720 or the model hosting system 740.

The model prediction data store 780 stores outputs (e.g., execution results) generated by the ML scoring containers 750 in some embodiments. While the model prediction data store 780 is depicted as being located external to the model training system 720 and the model hosting system 740, this is not meant to be limiting. For example, in some embodiments not shown, the model prediction data store 780 is located internal to at least one of the model training system 720 and the model hosting system 740.

While the model training system 720, the model hosting system 740, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 720 and/or the model hosting system 740 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 720 and/or the model hosting system 740 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
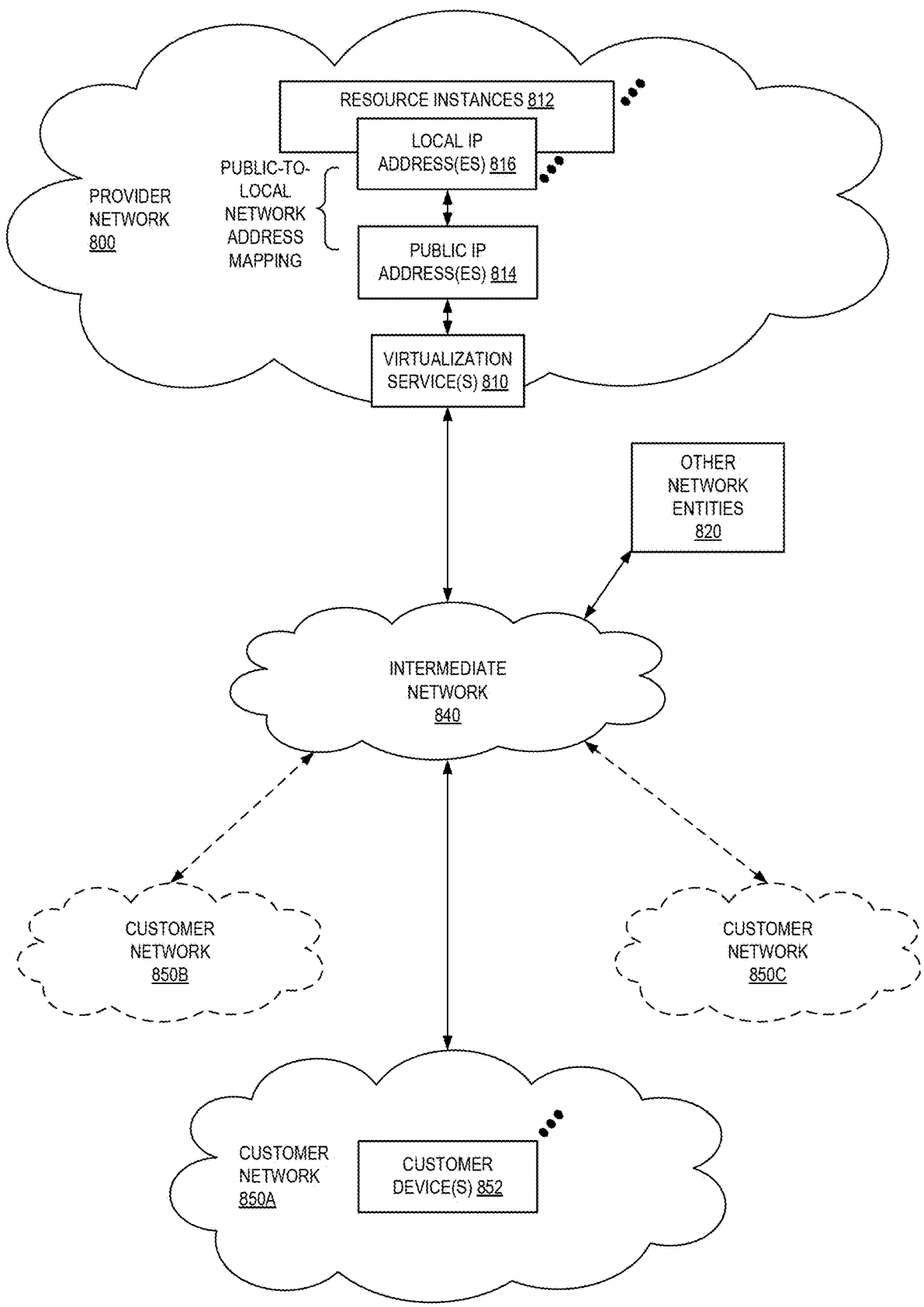
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
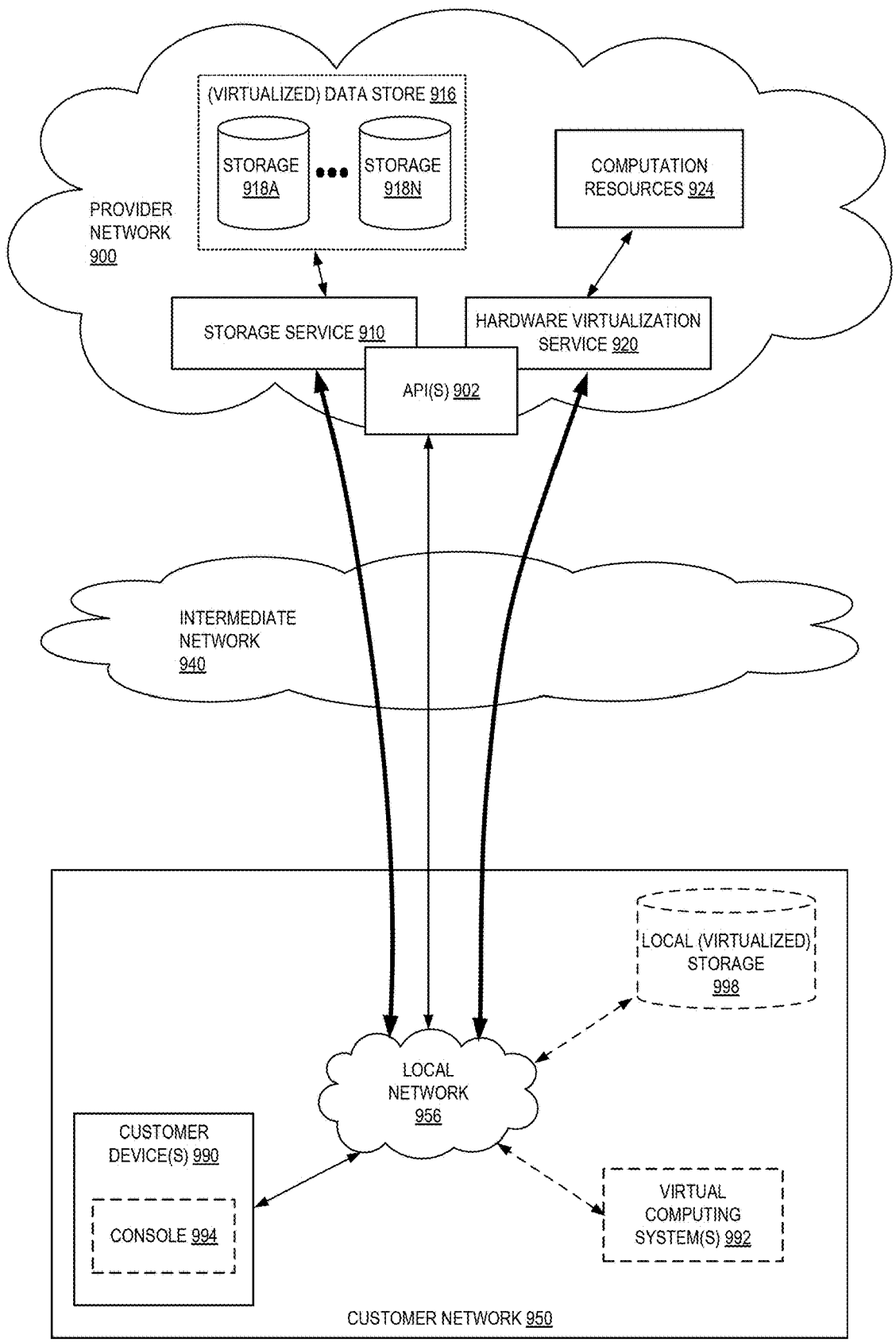
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
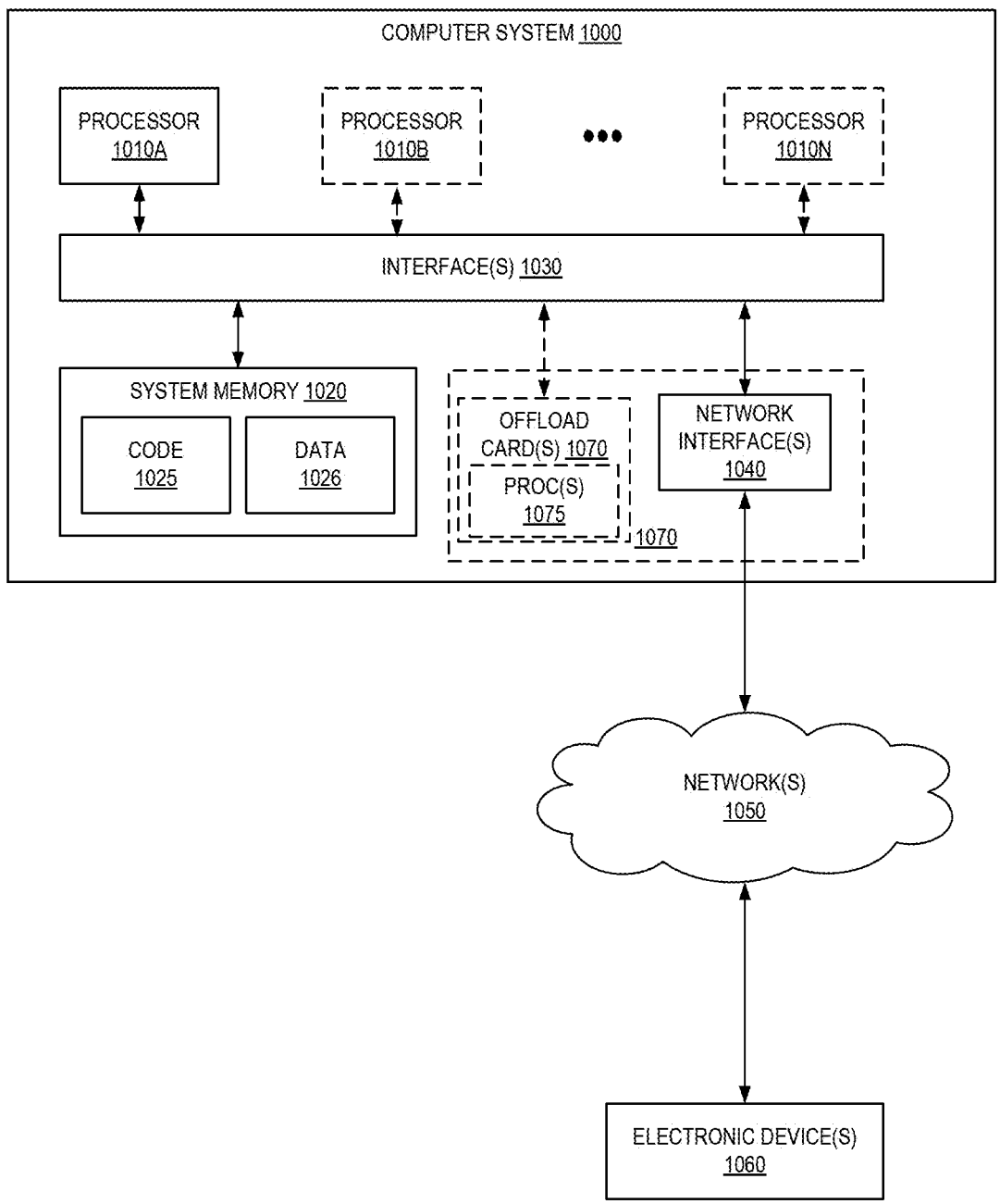
FIG. 10 is a block diagram illustrating an example computer system that may be used in some embodiments.

In some embodiments, a system that implements a portion or all of the techniques for forecasting using deep factor models with random effects as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
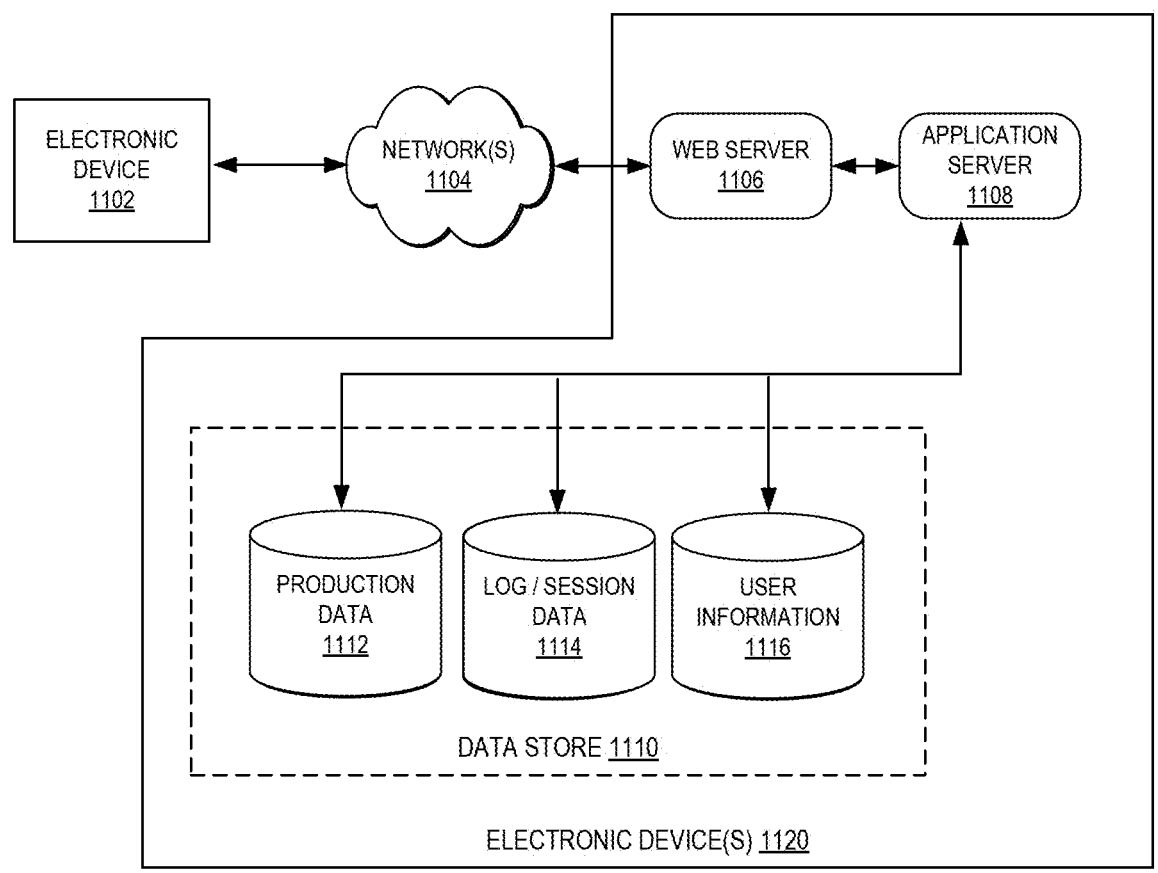
FIG. 11 illustrates an example of an environment for implementing aspects in accordance with various embodiments.

As discussed herein, different approaches can be implemented in various environments in accordance with the described embodiments. For example, FIG. 11 illustrates an example of an environment 1100 for implementing aspects in accordance with various embodiments. For example, in some embodiments the training requests and/or forecast requests are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a web service endpoint of a provider network, a request to generate a time series forecast for a first entity for a time window comprising one or more points of time;
    generating, using at least a recurrent neural network (RNN) trained based on time series data from a plurality of entities, a global prediction for the time window;
    generating, using at least a state-space model (SSM) corresponding to the first entity, a local prediction for the time window, wherein the SSM was trained to model a difference between one or more global patterns generated by the RNN and values from time series data of the first entity;
    generating, based on the global prediction and the local prediction, the time series forecast for the first entity; and
    sending data comprising the time series forecast.

2. The computer-implemented method of claim 1, wherein the RNN and the SSM are trained together according to an iterative process that includes repeatedly updating parameters of the RNN and parameters of the SSM.

3. The computer-implemented method of claim 2, wherein the training of the RNN and the SSM includes:
    generating, using the RNN, a first one or more global patterns based on the time series data of the plurality of entities;
    generating, based on subtracting the first one or more global patterns from the time series data of the first entity, a set of residuals; and
    adjusting the SSM to fit the set of residuals.

4. A computer-implemented method comprising:
    generating, using at least a neural network, a global prediction for one or more points in time, wherein the neural network was trained based on time series data of a plurality of entities;
    generating, using at least a probabilistic model that is specific to a first entity, a local prediction for the one or more points in time, wherein the probabilistic model was trained to model a difference between one or more global patterns generated by the neural network and values from time series data of the first entity;

generating, based on the global prediction and the local prediction, a time series forecast for the first entity; and sending data comprising the time series forecast.

5. The computer-implemented method of claim 4, further comprising:

receiving, at a web service endpoint of a provider network, a request to generate the time series forecast for the first entity, wherein the request was originated by an electronic device of a user, and wherein sending data comprises sending the data to the electronic device.

6. The computer-implemented method of claim 4, further comprising training the neural network and the probabilistic model, wherein the training includes using an iterative process.

7. The computer-implemented method of claim 6, wherein the training includes:

generating, using the neural network, a first one or more global patterns based on the time series data of the plurality of entities;

generating, based on subtracting the first one or more global patterns from time series data of the first entity, a set of residuals; and adjusting the probabilistic model to fit the set of residuals.

8. The computer-implemented method of claim 7, wherein the training further includes:

after adjusting the probabilistic model, adjusting the neural network based at least in part on the adjusted probabilistic model.

9. The computer-implemented method of claim 4, wherein the neural network comprises a recurrent neural network (RNN).

10. The computer-implemented method of claim 9, wherein the neural network further comprises at least one of: an attention network or a recognition network.

11. The computer-implemented method of claim 9, wherein the probabilistic model is a state-space model (SSM).

12. The computer-implemented method of claim 11, wherein the SSM comprises a linear dynamical system (LDS).

13. The computer-implemented method of claim 4, wherein the plurality of entities comprises a plurality of products and the time series data of the plurality of entities comprises amounts of sales of the plurality of products.

14. The computer-implemented method of claim 4, wherein generating, based on the global prediction and the local prediction, the time series forecast for the first entity comprises adding the global prediction to the local prediction to yield the time series forecast.

15. A system comprising:

a first one or more electronic devices of a provider network, the first one or more electronic devices comprising one or more processors and instructions that upon execution cause the provider network to:

receive a request to generate a time series forecast for a first entity for a time window comprising one or more points of time; and send the request to a forecasting service of the provider network; and a second one or more electronic devices to implement the forecasting service of the provider network, the forecasting service including instructions that upon execution cause the forecasting service to:

train a probabilistic model that is specific to the first entity to model a difference between one or more global patterns generated by a neural network and values from time series data of the first entity;

generate, using at least the neural network, a global prediction for one or more points in time, wherein the neural network is trained based on time series data of a plurality of entities;

generate, using at least the probabilistic model that is specific to the first entity, a local prediction for the one or more points in time, wherein the probabilistic model is trained to model a difference between one or more global patterns generated by the neural network and values from time series data of the first entity;

generate, based on the global prediction and the local prediction, the time series forecast for the first entity; and send data comprising the time series forecast.

16. The system of claim 15, wherein the instructions upon of the forecasting service, upon execution, further cause the forecasting service to train the neural network and the probabilistic model via an iterative process.

17. The system of claim 16, wherein to train the neural network, the forecasting service is to at least:

generate, using the neural network, a first one or more global patterns based on the time series data of the plurality of entities;

generate, based on subtracting the first one or more global patterns from time series data of the first entity, a set of residuals; and adjust the probabilistic model to fit the set of residuals.

18. The system of claim 17, wherein to train the neural network, the forecasting service is further to at least:

after adjusting the probabilistic model, adjust the neural network based at least in part on the adjusted probabilistic model.

19. The system of claim 15, wherein the neural network comprises a recurrent neural network (RNN), and the probabilistic model is a state-space model (SSM).

20. The system of claim 19, wherein:

the neural network further comprises at least one of: an attention network or a recognition network; and the SSM comprises a linear dynamical system (LDS).

* * * * *